(No Model.)
W. GLASS.
MUSIC CHART.
No. 372,139. Patented Oct. 25, 1887.
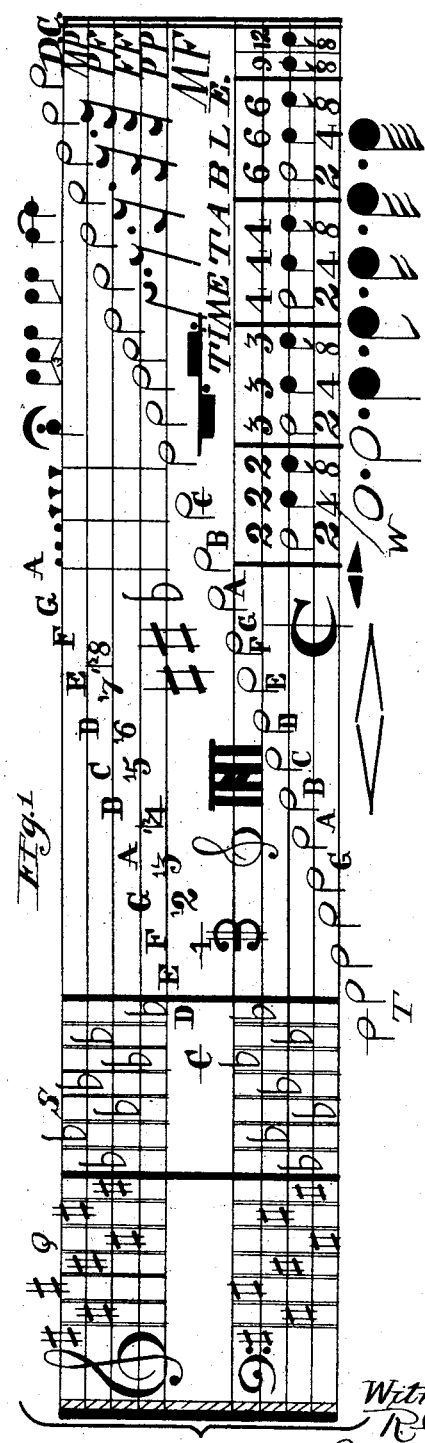
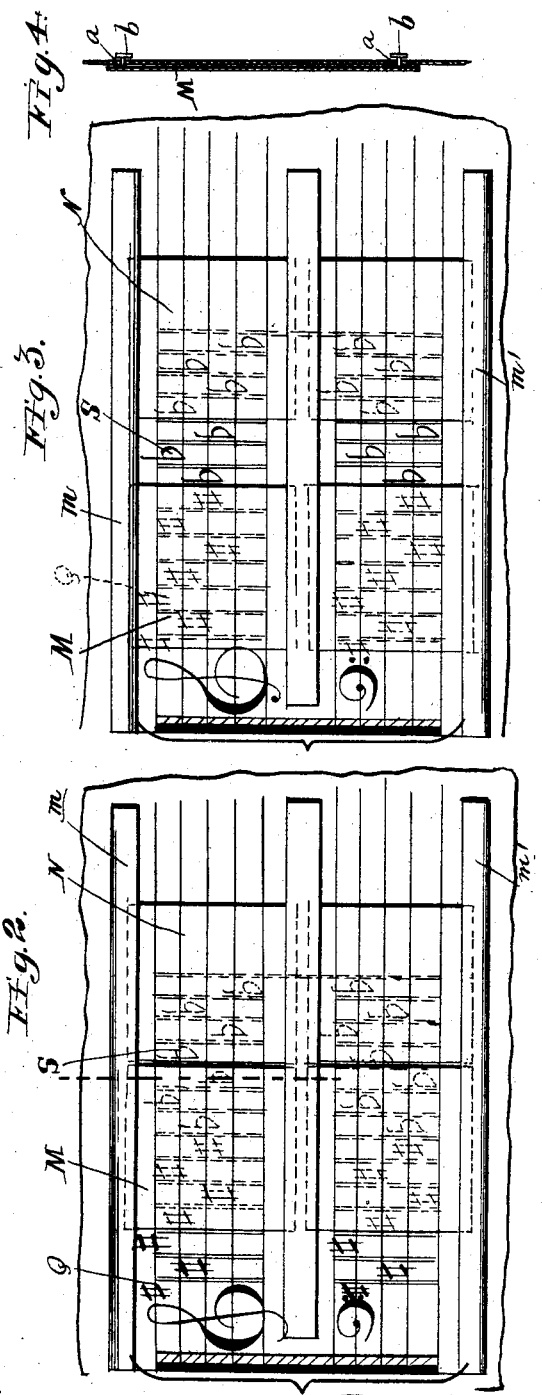
Witnesses:
R. C. Laurie
Van Buren Hillyard
Inventor
Washington Glass
By R. S. & A. P. Lacey, attys ively arranged relative to the staff, indicat-
UNITED STATES PATENT OFFICE.

WASHINGTON GLASS, OF NEW ATHENS, OHIO.

MUSIC-CHART.

SPECIFICATION forming part of Letters Patent No. 372,139, dated October 25, 1887.

Application filed August 9, 1887. Serial No. 246,520. (No model.)

*To all whom it may concern:*

Be it known that I, WASHINGTON GLASS, a citizen of the United States, residing at New Athens, in the county of Harrison and State of Ohio, have invented certain new and useful Improvements in Indicators and Charts for Teaching Music; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an indicator for facilitating the acquiring and teaching of music.

The object of the improvement is the construction of a simple means which will lessen the labor of the preceptor and assist the pupil in mastering the elements of music, especially that part relating to the transposition of the scale and the value of the notes.

The improvement consists in the novel features and peculiar construction and combination of parts, which will be more fully hereinafter set forth and claimed, and shown in the annexed drawings, in which—

Figure 1 is a view of a chart embodying my invention; Fig. 2, a view of a chart, parts being broken away, showing the slides moved to represent the key in sharps; Fig. 3, a view similar to Fig. 2, but showing the slides differently arranged relative to the staff, indicating the key in flats; Fig. 4, a cross section, on an enlarged scale, showing a modified form of securing the slide to the chart.

Fig. 1 is a staff or chart embodying the elements of music. To the left of the staff is the signature, which is composed of two characters or sets of characters, as the sharps Q and the flats S. To the right of the signature, and arranged diagonally across the staff, is the extended scale T. The time-table W, located at the lower right-hand corner of the staff, is made up of a series of bars, each bar representing a different time or number of beats to the measure, notes of different degrees, and the numerical value of the notes. These several features are indicated on different lines. The upper line indicates the time, the middle line the notes, and the lower line the numerical value of the notes. The signature is covered by two slides, M and N. The slide M is arranged opposite the sharps and the slide N opposite the flats. The slides may be moved together, as shown by Fig. 2, or they may be separated and moved in opposite directions, as shown by Fig. 3, to uncover the desired portion of the signature to obtain the required key, be it sharp or flat or a combination of both.

I do not wish to limit myself to the application of the slides to the chart shown, as it is evident that they may be applied to any musical staff, whether blank or written, for obtaining the desired key or for transposing from one key to another, as may be required or found necessary. The slides, which may be of any desired material, may be held to the chart in any approved manner or in any convenient way. In Figs. 2 and 3 they are shown held in place by retaining-lips $m$ and $m'$, arranged above and below the staff and overlapping the top and bottom edges of the slides.

Fig. 4 shows a construction in which the chart has two slots, $a$, the one above and the other below the staff. The shanks of two buttons, $b$, pass through these slots. One end of said shanks is secured to the slide, and the other end is provided with a plate which overlaps the edges of the slots and prevents the accidental displacement of the slide.

The device as shown in Figs. 2 and 3 can be used as an attachment and applied to any staff, particularly if the staff is painted on a wall or blackboard. All that is necessary is to have the lines of the attachment correspond with the lines of the staff on said wall or blackboard.

Having thus described my invention, what I claim, and desire to secure by Letters Patent, is—

1. The herein-described device for teaching music, composed of the chart or base provided with a staff having a signature written thereon, and the slide adapted to be moved longitudinally along the staff over the signature for covering and uncovering it wholly or in part, substantially as and for the purpose described.

2. The hereinbefore-described means for teaching music, composed of the chart or base provided with a staff and having a signature consisting of two separate characters or sets of characters written on the staff, and two independent slides, one for each character or set of characters, adapted to slide longitudinally along and over the staff for covering and uncovering said character or characters wholly or in part, substantially as and for the purpose specified.

3. A chart for teaching music provided with a staff and having letters or characters written on the staff, and provided with a signature, and having a slide arranged to move longitudinally over and along the staff for covering and uncovering said signature wholly or in part, substantially as and for the purpose specified.

4. The herein-specified indicator for teaching music, composed of a flexible sheet provided with a musical staff and having a slide placed over and adapted to slide longitudinally along on the staff for covering and uncovering portions thereof, substantially as and for the purpose described.

5. A chart for teaching music provided with a staff and having the staff divided up into a series of bars or measures, each bar or measure representing a different time or number of beats to the measure, and having three lines of characters arranged in series above each other, the middle line being the notes, the lower line being figures which represent the value of the notes, and the upper line being figures to indicate the time, substantially as specified.

In testimony whereof I affix my signature in presence of two witnesses.

WASHINGTON GLASS.

Witnesses:
VAN BUREN HILLYARD,
G. P. KRAMER.